US012768409B2

(12) United States Patent
Brok

(10) Patent No.: US 12,768,409 B2
(45) Date of Patent: Oct. 20, 2026

(54) BRAKE LINING ARRANGEMENT FOR A VEHICLE DISC BRAKE, AND DISC BRAKE FOR A VEHICLE

(71) Applicant: AUDI AG, Ingolstadt (DE)

(72) Inventor: Tobias Brok, Kösching (DE)

(73) Assignee: Audi AG, Ingolstadt (DE)

( * ) Notice: Subject to any disclaimer, the term of this patent is extended or adjusted under 35 U.S.C. 154(b) by 421 days.

(21) Appl. No.: 18/554,809

(22) PCT Filed: Mar. 8, 2022

(86) PCT No.: PCT/EP2022/055934
§ 371 (c)(1),
(2) Date: Oct. 11, 2023

(87) PCT Pub. No.: WO2022/242925
PCT Pub. Date: Nov. 24, 2022

(65) Prior Publication Data

US 2024/0117850 A1 Apr. 11, 2024

(30) Foreign Application Priority Data

May 20, 2021 (DE) ......................... 102021113070.0

(51) Int. Cl.

| | |
|---|---|
| ***F16D 65/097*** | (2006.01) |
| ***F16D 55/22*** | (2006.01) |
| *B60T 1/06* | (2006.01) |
| *F16D 127/02* | (2006.01) |

(52) U.S. Cl.
CPC ......... *F16D 65/0972* (2013.01); *F16D 55/22* (2013.01); *B60T 1/065* (2013.01); *F16D 2127/02* (2013.01); *F16D 2200/0004* (2013.01)

(58) Field of Classification Search
None
See application file for complete search history.

(56) References Cited

U.S. PATENT DOCUMENTS

2020/0040953 A1 2/2020 Baek

FOREIGN PATENT DOCUMENTS

| | | | |
|---|---|---|---|
| DE | 102013016779 | A1 | 4/2015 |
| DE | 202015104454 | U1 | 10/2015 |
| DE | 102016211147 | A1 | 12/2017 |
| DE | 102017001089 | A1 | 8/2018 |
| FR | 3030664 | A1 | 6/2016 |

(Continued)

OTHER PUBLICATIONS

JP59080534A: English Machine Translation (Year: 1984).*

(Continued)

*Primary Examiner* — Melanie Torres Williams
(74) *Attorney, Agent, or Firm* — Maier & Maier, PLLC

(57) ABSTRACT

A brake lining arrangement for a disc brake of a vehicle, including at least one brake lining, which is arranged axially spaced apart from a brake disc in a starting position in the installed state of the disc brake. The brake lining includes a lining carrier plate, on which a friction lining is attached. A spring element positioning the brake lining is arranged on at least one brake lining, which spring element is at least partially formed from a bimetal element and changes the axial distance of the brake lining relative to the brake disc in the starting position as a function of a temperature.

14 Claims, 4 Drawing Sheets

(56) References Cited

FOREIGN PATENT DOCUMENTS

| | | | | |
|---|---|---|---|---|
| FR | 3030859 | A1 | | 6/2016 |
| JP | 59080534 | A | * | 5/1984 |
| JP | H07217680 | A | | 8/1995 |
| JP | 2006090464 | A | | 4/2006 |
| KR | 20050834498 | A | * | 8/2005 |
| KR | 100836342 | B1 | | 6/2008 |
| KR | 1020170010547 | A | | 2/2017 |
| WO | 2020028710 | A1 | | 2/2020 |
| WO | 2020128710 | A1 | | 6/2020 |

OTHER PUBLICATIONS

KR20050834498A: English Machine Translation (Year: 2005).*
Examination Report issued on Aug. 14, 2025, in corresponding European Application No. 22 711 949.2, 13 pages.
International Search Report and Written Opinion issued on Jun. 10, 2022, in corresponding International Application No. PCT/EP2022/055934, 18 pages.
International Preliminary Report on Patentability issued on Nov. 21, 2023, in corresponding International Application No. PCT/EP2022/055934, 15 pages.
Search Report issued on Feb. 22, 2022, in corresponding German Application No. 102021113070.0, 10 pages.
Office Action issued on Mar. 16, 2026, in corresponding Chinese Application No. 202280031941.4, 15 pages.

* cited by examiner

BRAKE LINING ARRANGEMENT FOR A VEHICLE DISC BRAKE, AND DISC BRAKE FOR A VEHICLE

FIELD

The invention relates to a brake lining arrangement for a vehicle disc brake according to the type specified in the preamble of claim 1 and a disc brake for a vehicle according to claim 10.

BACKGROUND

A disc brake for a vehicle typically comprises a housing having a brake caliper and a brake lining arrangement, accommodated in the housing, which is arranged on a brake disc. The brake lining arrangement comprises at least one brake lining, which includes a lining carrier plate having a friction lining. The brake linings can be moved by means of a tensioning unit in the direction of the brake disc in order to achieve a braking effect in an engagement position, in which the friction lining is brought into interaction with the rotating brake disc. For optimum functioning of the brakes, it is indispensable for the brake linings to be held in position, for example, by means of lining retainer springs, detent clamps, or the like.

It is known that the brake lining does not reset in a controlled manner into a starting position after a braking procedure, in which the friction lining is spaced apart by a so-called air gap from the brake disc. The brake lining is thus supplied to the brake disc after a braking procedure in an unpressurized but grinding manner, and residual friction arises in the brake, which results in elevated and/or uneven wear of the brake linings, uneven vibration excitations, and/or an elevated driving resistance and thus an elevated fuel consumption. In order to move the friction lining back into the starting position after a deflection, a restoring device can exert a restoring force on the brake lining, in order to pull it actively away from the brake disc. Possibly still existing contacts or residual coefficients of friction between brake lining and brake disc are thus prevented or at least significantly reduced.

A disc brake is described in DE 10 2013 016 779 A1, which comprises a brake carrier, a brake lining arrangement, the friction lining guided in the brake carrier having a lining carrier plate, and a restoring device. The friction lining can be brought into interaction with a brake disc in order to achieve a braking effect. The restoring device comprises at least one restoring spring, which is supported by the brake carrier and is configured to exert a restoring force on the lining carrier plate in order to move the friction lining back into a starting position after a deflection.

DE 10 2016 211 147 A1 describes a disc brake for a vehicle which comprises a brake carrier in which a brake lining is reversibly displaceable from a starting position into an engagement position, in which the brake lining is engaged with a brake disc. The disc brake includes a wear-compensating restoring device, which exerts a restoring force on the brake lining in order to move the brake lining back into the starting position after braking. The restoring device includes a restoring spring connected to the brake lining, which holds the brake lining in the non-actuated state in the starting position in relation to the brake carrier.

A disc brake for a vehicle is described in FR 3 030 664 A1, which includes at least one brake lining and a piston, which presses the brake lining against the brake disc during a braking procedure. The disc brake includes at least one element which is capable of being applied to the brake lining and the piston in relation to one another in an engagement position. The element has a dimension along a direction parallel to a longitudinal axis of the piston which decreases when a temperature of the element increases. In this manner, the element compensates for the thermal contraction or expansion of the braking system, in order to ensure that the brake pressure, in particular of the parking brake, is maintained over time.

FR 3 030 859 A1 describes a disc brake for a vehicle which includes features of the type in question. The disc brake comprises a brake lining arrangement having at least one brake lining, a brake disc, and a piston which is capable during a braking procedure of pressing the brake lining against the brake disc. The brake lining is connected to the piston and/or a brake caliper with a thermal actuator interposed. The thermal actuator includes a bimetal strip, the metal bands of which are connected to one another at their respective ends and are separated in the middle by a recess, wherein the metal bands in particular have different coefficients of thermal expansion. At the end of a braking procedure and/or at regular intervals, the bimetal strip is briefly heated by means of a control unit in order to expand the recess on one side. Upon cooling, it contracts again, by which the bimetal strip is pulled into a starting position or detaches from the brake disc in order to prevent a residual braking torque or residual coefficients of friction.

In particular in electric and/or hybrid vehicles, the kinetic energy arising during braking can be reclaimed by recuperation and fed into the battery. Due to the dissipated heat, water can ice on the cold brake discs in cold weather conditions, due to which almost no coefficient of friction is present between the brake disc and the friction lining and a braking distance is lengthened in a safety-critical manner.

There are approaches for estimating the temperature at the wheel brakes on the basis of temperature sensor information and proactively heating the brake discs by pressure buildup in the brake in corresponding weather conditions. However, the safety and availability requirements for such a function and the sensors are very high and complex.

SUMMARY

The invention is based on the object of proposing a brake lining arrangement for a vehicle disc brake which has a high level of braking reliability at low temperatures. A further object is to propose a disc brake for a vehicle.

In a known manner, a brake lining arrangement for a vehicle disc brake comprises at least one brake lining, which is formed having a lining carrier plate on which a friction lining is attached. In the installed state of the brake lining arrangement, the brake lining is arranged in a starting position axially spaced apart from a brake disc. In order to achieve a braking action, the brake lining is movable starting from the starting position in the direction of the brake disc in order to bring the friction lining into interaction with the rotating brake disc in an engagement position. The brake lining is spaced apart from the brake disc by a so-called air gap in the starting position, which is used to cool the brake disc by air circulation and prevent unnecessary wear of the friction lining.

According to the invention, a spring element positioning the brake lining is arranged on at least one brake lining, which spring element is at least partially formed from a bimetal element and changes the axial distance of the brake lining relative to the brake disc in the starting position as a function of a temperature.

The spring element can comprise, for example, a lining retainer spring, a detent clamp, or the like, which is used to guide the brake lining or via which the brake lining is held in position in the installed state of the brake lining arrangement in a vehicle disc brake and is supported against circumferential forces.

It is also possible that the spring element comprises a restoring spring, which is used to move the brake lining back into a starting position after a deflection in the direction of a brake disc.

The spring element positioning the brake lining is engaged with the brake lining. The spring element and the brake lining can be riveted with one another, for example, or can be connected to one another via interlocking elements. The starting position of the brake lining is variable as a function of a temperature via the spring element. In other words, an order of magnitude of the air gap via which the brake lining is arranged axially spaced apart from the brake disc is changeable as a function in particular of a temperature of the disc brake.

For this purpose, the spring element includes a bimetal element. The bimetal element consists of two materials or metals and/or alloys, which are permanently connected to one another and expand or contract at different strengths upon equal temperature changes, i.e., temperature increase or decrease, due to respective different coefficients of expansion. In particular, the bimetal element can be designed as a bimetal strip, which comprises two layers having materials which have different coefficients of expansion. In comparison to a material having a lower coefficient of expansion, which is also designated as a passive component, a material having a higher coefficient of expansion, also called an active component, contracts more upon cooling and causes a curvature of the bimetal element toward the material having the higher coefficient of expansion. Upon a temperature increase, the material having the higher coefficient of expansion expands more and causes a curvature of the bimetal element toward the material having the lower coefficient of expansion.

The spring element uses the capability of bending or deformation of the bimetal element in order to axially position the brake lining in the starting position relative to the brake disc or set the air gap as a function of a temperature. The bimetal element of the spring element can thus deform or bend at a high temperature, for example, in such a way that the spring element increases the axial distance to the brake disc or enlarges the air gap, in order to prevent or largely reduce a contact between the friction lining and the brake disc.

At a low temperature, in contrast, the bimetal element deforms in such a way that the air gap is reduced in size and a residual braking torque results between the brake lining and the brake disc. This advantageously prevents, in particular in electric and/or hybrid vehicles, the brakes of which have a low temperature due to recuperation, water from icing on the cold brake discs in cold weather conditions, by which a braking distance is lengthened in a safety-endangering manner.

The spring element according to the invention enables a coefficient of friction between the brake disc and the friction lining to be present at low temperatures, by which short braking distances are insured. The spring element is advantageously robust and simple to produce, and is based on a mechanical movement which does not require a current source or sensors. A further advantage is the ability to retrofit the spring element in already existing disc brakes without modifying or processing them.

According to one preferred embodiment, the spring element, in the installed state of the brake lining arrangement in a disc brake, reduces by way of the bimetal element the axial distance at a predetermined temperature and/or upon falling below the predetermined temperature, in order to generate a coefficient of friction between the brake lining and the brake disc. The predetermined temperature can be defined, for example, as the freezing point of water, or as a temperature between 2° C. and 5° C., in particular 3° C.

The dimensions of the bimetal element and the material combinations are adapted after the specific thermal curvature of the spring element and the application temperature are made more precise.

The bimetal element of the spring element is thus selected such that the spring element bends or curves at and/or below the predetermined temperature in a direction such that the brake lining is displaced in the direction of the brake disc and reduces the axial distance to the brake disc or the air gap. The reduction of the air gap is such that a residual braking torque results, i.e., residual coefficients of friction are effectuated between the brake lining on the brake disc. At temperatures above the predetermined value, the spring element bends in the opposite direction due to the curvature of the bimetal element, in order to increase the axial distance of the brake lining relative to the brake disc to avoid residual coefficients of friction.

Advantageously, as a function of the temperature of the spring element in the installed state of the brake lining arrangement in a vehicle disc brake, possibly still existing contacts or residual coefficients of friction between brake linings and brake disc are either present due to the dimensions of the air gap in order to heats the brake disc at low temperatures, or are prevented or strongly reduced in order to prevent unnecessary wear of the friction lining at higher temperatures.

The spring element preferably includes at least one spring arm, which engages on a rear side of the lining carrier plate facing away from the friction lining, where the spring arm is connected to a spring bridge arranged at an angle to the spring arm and to the lining carrier plate. The friction lining is attached to a front side of the lining carrier plate, whereas the spring element engages via the spring arm opposite to the friction lining on a rear side of the lining carrier plate. The spring element engaging on the friction lining is connected here to a spring bridge, which in particular extends approximately orthogonally to both the lining carrier plate and the spring element. The spring bridge can span a circumferential surface of the lining carrier plate. The spring element can, for example, actively pull the brake linings away from the brake disc after a deflection during a braking process via a restoring force acting on the lining carrier plate. The bimetal element is arranged on the spring element such that at a predetermined low temperature, it achieves less restoration of the brake lining than at a higher temperature.

According to one embodiment, the spring bridge connects the spring arm to a detent clamp, which engages around a lateral circumferential surface of at least one lining carrier plate at least partially in the circumferential direction. The detent clamp can extend along the lateral circumferential surface of the lining carrier plate and engage around the lining carrier plate in the circumferential direction. The detent clamp can be formed having legs, for example, which press against a recess of the lateral circumferential surface of the lining carrier plate. The detent clamp supports the brake lining in the installed state of the brake lining arrangement in a disc brake against circumferential forces, and holds it in position with respect to the brake disc by pre-tension in the radial direction. The detent clamp can be arranged in the installed state of the brake lining arrangement in a disc brake in particular between a brake carrier of a caliber brake and the lateral circumferential surface of the lining carrier plate. The detent clamp can be, for example, connected to the brake carrier or formed thereon.

The spring element is connected, in particular riveted, via the spring arm to the lining carrier plate, wherein the spring arm is connected via the spring bridge to the detent clamp. The spring bridge can be connected via a connecting element to the detent clamp. The spring element can be designed, for example, as a leaf spring and can extend in the direction of the detent clamp originating from the rear side of the lining carrier plate. The spring bridge is arranged at an angle here, in particular approximately orthogonally, to the spring arm and to the lining carrier plate, so that the spring element axially spans, for example, the lateral circumferential surface of the lining carrier plate, in particular engages or clamps around it spaced apart in the axial direction. The spring element is advantageously arranged on the brake lining such that it can act with a restoring force on the brake lining, in order to move it after a deflection into the starting position.

The spring element is preferably formed in one piece with the detent clamp. This reduces the variety of parts and contributes to simple production and arrangement.

According to an alternative embodiment, the spring bridge axially spans the brake linings arranged mutually opposite on the brake disc, wherein the spring bridge connects the spring arms engaging on the respective lining carrier plate to one another. The spring element can be designed, for example, as a leaf spring, the spring bridge of which extends approximately orthogonally to the brake linings. The respective spring arms extend here at an angle, in particular approximately perpendicularly, to the spring bridge. The spring arms are each connected, for example riveted or latched, with a lining carrier plate or its rear side.

In the installed state of the brake lining arrangement in the vehicle disc brake, the spring element spans the brake linings and the brake disc arranged between them. The spring element can be designed as a lining retainer spring, which is held in the installed state of the brake lining arrangement, for example, via holding elements in a shaft or a recess of a housing of a fixed caliper. In this way, the lining retainer spring can exert a tension force, in particular a retaining force, on the brake lining, in order to tension it downward and position it radially with respect to the brake disc.

The spring arm preferably includes the bimetal element. The bimetal element is arranged on the respective spring arms, in particular of the lining retainer spring, such that the active component having the high coefficient of expansion is arranged in the direction of the brake lining and the passive component having the low coefficient of expansion is arranged in the opposite direction, i.e., facing away from the brake lining.

At the predetermined low temperature or a lower temperature, the active component contracts more than the passive component. The spring arms thus bend convexly with respect to the rear side of the lining carrier plate, i.e., they bend toward the active component having the higher coefficient of expansion. This curvature causes a displacement of the spring arms in the direction of the brake disc, which causes a movement of the respective brake linings in the direction of the brake disc in the starting position. The axial distance or the air gap is thus reduced in the starting position of the brake lining and restoring of the brake lining in the starting position is less, due to which a residual braking torque is ensured.

At higher temperature, the spring arms bend concavely relative to the brake lining, since the active component expands more than the passive component. The bimetal element thus curves toward the passive component. Due to the curvature, the spring arms pull the respective brake linings with them away from the brake disc. The axial distance or the air gap thus becomes larger, the restoring of the brake lining after a deflection is greater, due to which the residual braking torque is prevented or strongly reduced.

According to one embodiment, the spring bridge includes the bimetal element. The spring element can be designed here, for example, either as a restoring spring connected to the detent clamp or as a lining retainer spring. In this embodiment, the active component of the bimetal element, i.e., the layer having the higher coefficient of expansion, faces in the direction of the brake lining and the passive component having the lower coefficient of expansion faces away from the brake lining in the opposite direction. At the predetermined low temperature, the active component contracts more than the passive component. The spring bridge thus bends toward the active component, due to which the spring arms are displaced together with the brake linings in the direction of the brake disc. The axial distance or the air gap is thus reduced and restoring of the brake lining into the starting position is less. The starting position of the brake lining is axially displaced such that a residual braking torque results between the brake lining and the brake disc. The spring element advantageously ensures in the installed state of the brake lining arrangement that the brake disc heats up. The spring bridge having the bimetal element is thus designed such that at the predetermined low temperature and/or in a temperature range below this, at which, for example, there is the risk that water will ice on the brake disc, it curves in such a way that the axial distance between brake disc and brake lining is reduced.

At higher temperatures, at which water does not ice on the brake disc, the spring bridge bends in the opposite direction, i.e., toward the passive component and away from the brake lining, due to which the spring arms are pulled apart. The axial distance to the brake disc or the air gap thus increases in the starting position of the brake lining, and the restoring of the brake lining caused by the spring element after a deflection is greater, by which the residual braking torque is prevented or strongly reduced.

The spring bridge preferably includes a connection section, via which at least two long legs extending in the longitudinal direction of the brake lining are connected. The long legs are connected, for example, riveted, adhesively bonded, or the like, via the connection section to the spring bridge. Alternatively, it is possible that the long legs are formed in one piece with the spring element, wherein the spring element forms a one-piece crossed spring.

The connection section can be formed, for example, in a central region of the spring bridge. The long legs can have an elongated shape. They can be produced, for example, from a strip of spring sheet metal, which is bent or curved. At its respective ends facing away from the connection section, it can include a contact region, which engages in the installed state of the brake lining arrangement in a disc brake on the housing, in particular on crossbeams of a fixed caliper. The long legs are used to pre-tension the brake linings in the installed state of the brake lining arrangement in the radial direction of the brake disc, in particular using a tangentially acting tension force.

The invention furthermore relates to a disc brake for a vehicle, which comprises a frame-like housing that spans a brake lining arrangement arranged on a brake disc. The brake lining arrangement includes at least one brake lining, which is guided or mounted with play in a brake support body. The brake support body is designed in a floating caliper brake as a brake carrier and in a fixed caliber rate, the brake support body is embodied as a fixed caliper, which can be embodied in one piece as a monoblock or in multiple pieces, for example, by two fixed caliper halves.

The brake disc arranged between the brake linings is arranged on a wheel hub so it is rotatable around an axle. To achieve a braking action, the respective brake linings are movable by means of a tensioning unit in opposite directions in order to bring them into interaction with the brake disc.

According to the invention, the brake lining arrangement includes a spring element positioning the brake lining, which is at least partially formed from a bimetal element and, starting from a starting position of the brake lining, changes in axial distance of the brake lining relative to the brake disc as a function of a temperature.

BRIEF DESCRIPTION OF THE FIGURES

Further advantages and possible applications of the present invention result from the following description in conjunction with the exemplary embodiment shown in the drawings.

In the figures.

DETAILED DESCRIPTION

Figure 1:
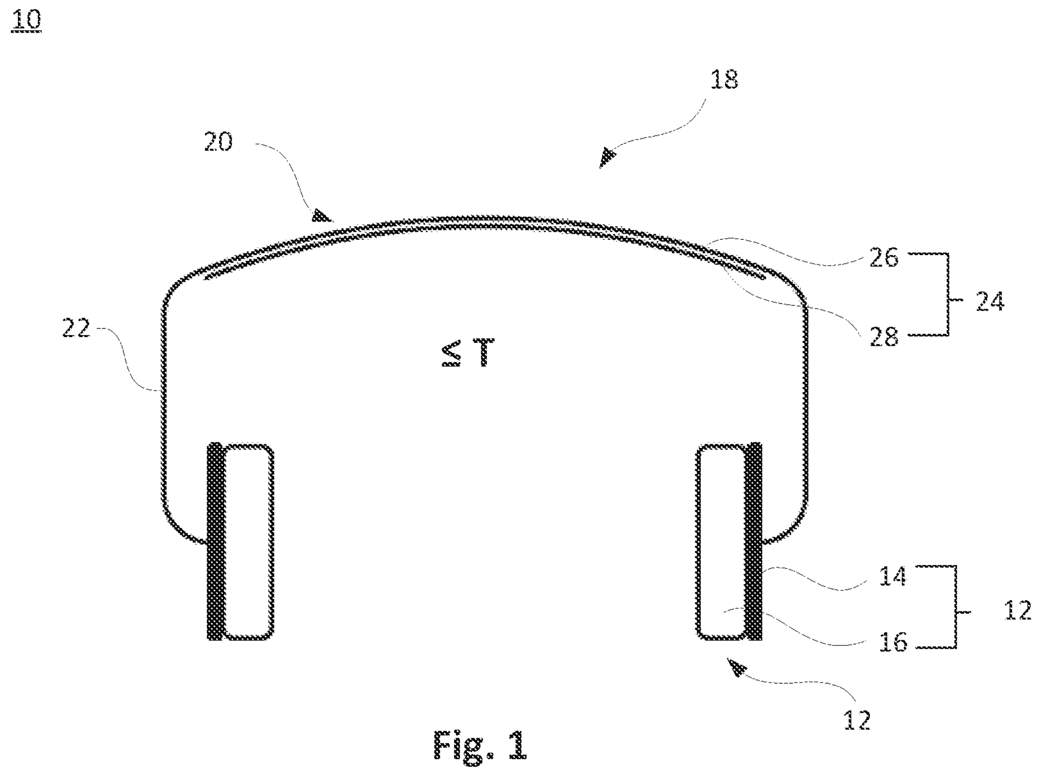
FIG. 1 shows a spring element of a brake lining arrangement according to the invention at a predetermined low temperature.

FIG. 1 to FIG. 4 show a brake lining arrangement designated as a whole by the reference numeral 10.

FIG. 1 shows a brake lining arrangement 10, which in the present case comprises two brake linings 12 spaced apart axially in relation to one another, each of which includes a brake lining carrier plate 14 and a friction lining 16 fastened thereon. In the installed state of the brake lining arrangement 10, a brake disc (not shown in the present case) is arranged between the friction linings 16 facing toward one another, using which brake disc the friction linings 16 are moved during a braking procedure by means of a tensioning device (also not shown in the present case) from a starting position into an engagement position, in which they interact with the brake disc.

A spring element 18, which in the present case spans both brake linings 12, is arranged on the brake linings 12. The spring element 18 is designed as a leaf spring and includes a spring bridge 20, which connects to spring arms 22 to one another. The spring arms 22 each extend at an angle to the spring bridge 20. In the present case, they extend approximately perpendicularly to the spring bridge 20.

At its respective ends, the spring element 18 engages on a rear side of the lining carrier plate 14 facing away from the friction lining 16. The spring element 18 is, for example, riveted to the lining carrier plate 14 or it can be engaged, for example, via a detent lug with a detent projection of the lining carrier plate 14.

In the installed state of the brake lining arrangement 10 in a vehicle disc brake 100, the brake linings 12 are pretensioned axially and radially by the present spring element 18. The spring element 18 exerts a restoring force on the brake linings 12 via the spring arms 22, in order to move them back into the starting position, in which the brake linings 12 are spaced apart via an air gap from the brake disc, after a deflection in the direction of the brake disc.

Figure 2:
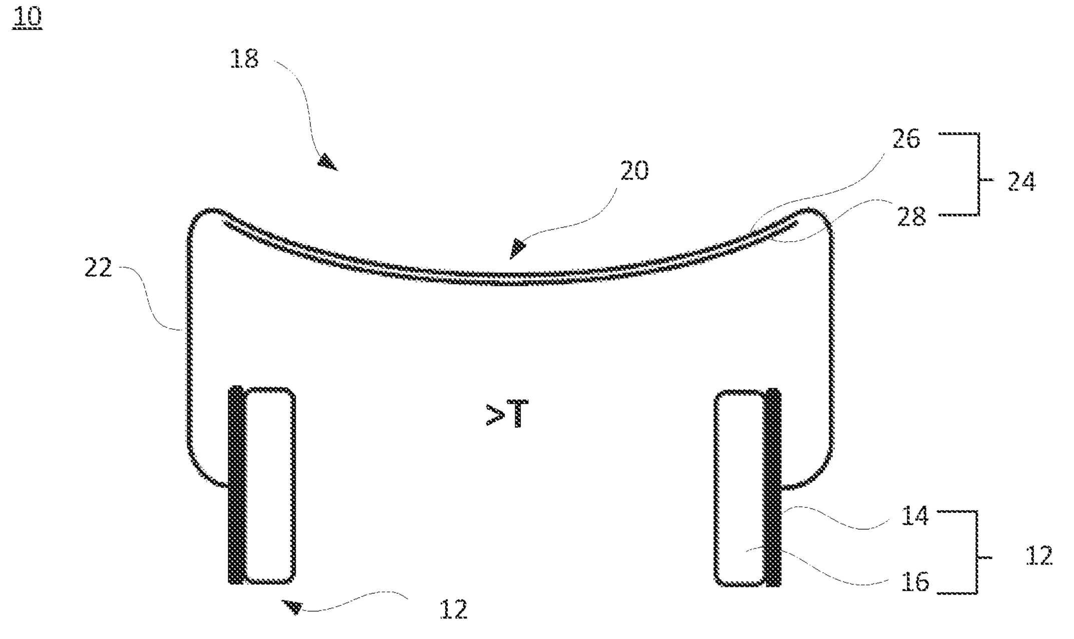
FIG. 2 shows a spring element of a brake lining arrangement according to the invention at a higher temperature.

According to the invention, the spring element 18 is at least partially formed from a bimetal element 24. FIG. 1 and FIG. 2 each show an embodiment of the spring element 18, in which the bimetal element 24 is arranged on the spring bridge 20. In the present case, the spring bridge 20 includes a bimetal strip 24, which is formed from two layers 26, 28 of different metals or alloys that are permanently connected to one another. The layers 26, 28 can be connected to one another, for example, by riveting, welding, adhesive bonding, or rolling. They have different coefficients of expansion. The first layer 26, which has a low coefficient of expansion, is arranged facing away from the brake lining 12 in the present case. The respective other second layer 28 has a higher coefficient of expansion and is arranged opposite to the first layer 26 in the direction toward the brake lining 12. The respective layers 26, 28 change by different distances upon equal temperature change. This is expressed as a bend of the bimetal strip 24 and the spring element 18 therefore deforms accordingly.

In FIG. 1, the spring element 18 is shown at a predetermined low temperature T. At low temperature T, the second layer 28 having the higher coefficient of expansion contracts more than the first layer 26. The spring bridge 20 thus curves toward the second layer 28, which is also designated as the active component. This deformation causes a reduction of an axial distance between the spring arms 22, which in turn move the respective brake lining 12 in the direction of a brake disc (not shown in the present case). The air gap, i.e., the axial distance between the brake lining 12 and the brake disc in the starting position of the brake lining 12 is thus reduced such that a residual braking torque results between the brake lining 12 and the brake disc. During a braking procedure, the brake lining 12 is deflected in the direction of the brake disc and the spring element 18 is used after the deflection to restore the brake lining 12, in order to reestablish the air gap. Due to the curvature of the bimetal element 24 at the predetermined low temperature T, the spring element 18 can only cause a slight restoring of the brake lining 12. A residual coefficient of friction thus remains between the brake lining 12 and the brake disc and the brake disc is in particular slightly heated in spite of recuperation.

FIG. 2 shows an illustration of the spring element 18 according to FIG. 1 at a higher temperature T. As shown in the present case, the bimetal element 24 or the spring bridge 20 bends in the opposite direction at temperatures T above the predetermined value. Upon heating, the second layer 28 expands more than the first layer 26. Characteristic concave bending of the bimetal strip 24 thus takes place. This has the result that the respective spring arms 22 of the spring element 18 move away from one another in opposite directions, by which an axial distance between the spring arms 22 is increased. Since the respective brake linings 12 are pulled along by the spring arms 22, the axial distance of the brake lining 12 from the brake disc in the starting position of the brake lining 12 increases. This results in a larger air gap, which is sufficiently large at higher temperatures T that residual coefficients of friction between the brake lining 12 and the brake disc are avoided or strongly reduced. After a deflection of the brake lining 12 in the direction of the brake disc during a braking procedure, the spring element 18 causes greater restoration of the brake lining 12 than at low temperatures T.

Figure 3:
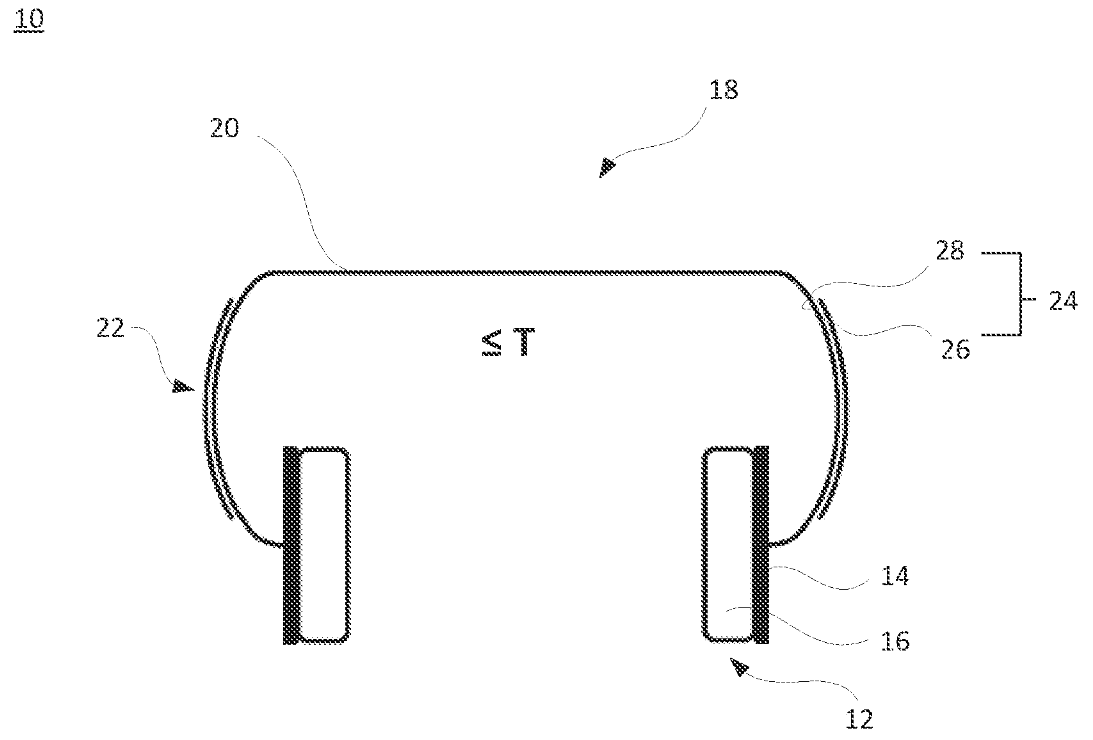
FIG. 3 shows a spring element of a brake lining arrangement according to the invention at a predetermined low temperature.
Figure 4:
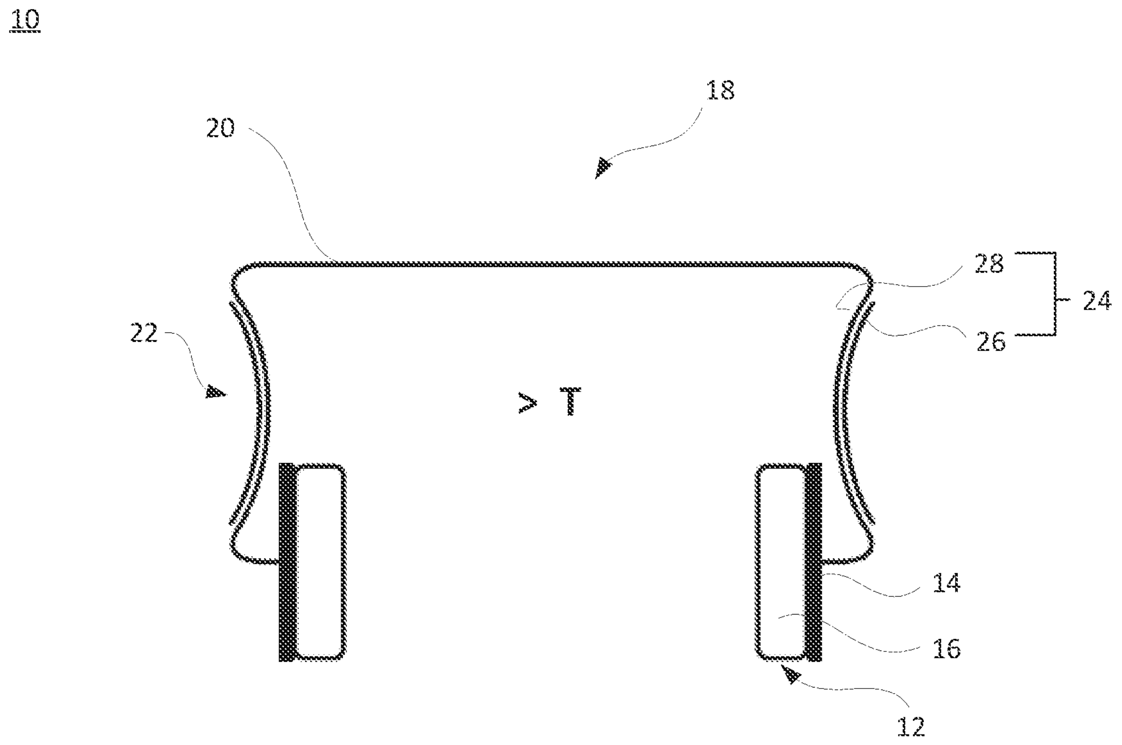
FIG. 4 shows a spring element of a brake lining arrangement according to the invention at a higher temperature.

FIG. 3 and FIG. 4 show an alternative embodiment of the spring element 18, in which the respective spring arms 22 include a bimetal element 24. The bimetal element 24 is designed in the present case as a bimetal strip. The first layer 26 having the low coefficient of expansion is arranged on an outside of the spring arms 22, facing away from the brake lining 12, and the second layer 28 having the higher coefficient of expansion is arranged opposite to the first layer 26 on an inside of the spring arm 22 in the direction of the brake lining 12.

As shown in FIG. 3, the second layer 28 contracts more at the predetermined low temperature T than the first layer 26. The bimetal element 24 bends toward the second layer 28. The spring arms 22 thus curve convexly with respect to the brake lining 12 and a distance between the two spring arms 22 is reduced, wherein the respective spring arms 22 pull the brake linings 12 along in the direction of the brake disc, by which the air gap is reduced. The spring element 18 exerts a restoring force on the brake linings 12, in order to bring them into the starting position after a deflection. The restoration of the brake linings 12 is minor at low temperature T, due to which a residual braking torque results between brake lining 12 and brake disc and the brake disc heats up.

FIG. 4 shows a spring element 18 according to FIG. 3 at an elevated temperature T. The bimetal element 24 bends in the present case in the opposite direction, because the second layer 28 expands more than the first layer 26. The bimetal element 24 bends in the direction of the first layer 26 or the spring arms 22 been concavely in relation to the brake lining 12, due to which the spring arms 22 move away from one another in opposite directions and a distance between them increases. The spring arms 22 pull along the brake linings 12 and the air gap becomes larger. In this manner, the restoring of the brake linings 12 by the spring element 18 is stronger at elevated temperature T, by which a residual braking torque between brake lining 12 and brake disc is prevented or reduced.

Figure 5:
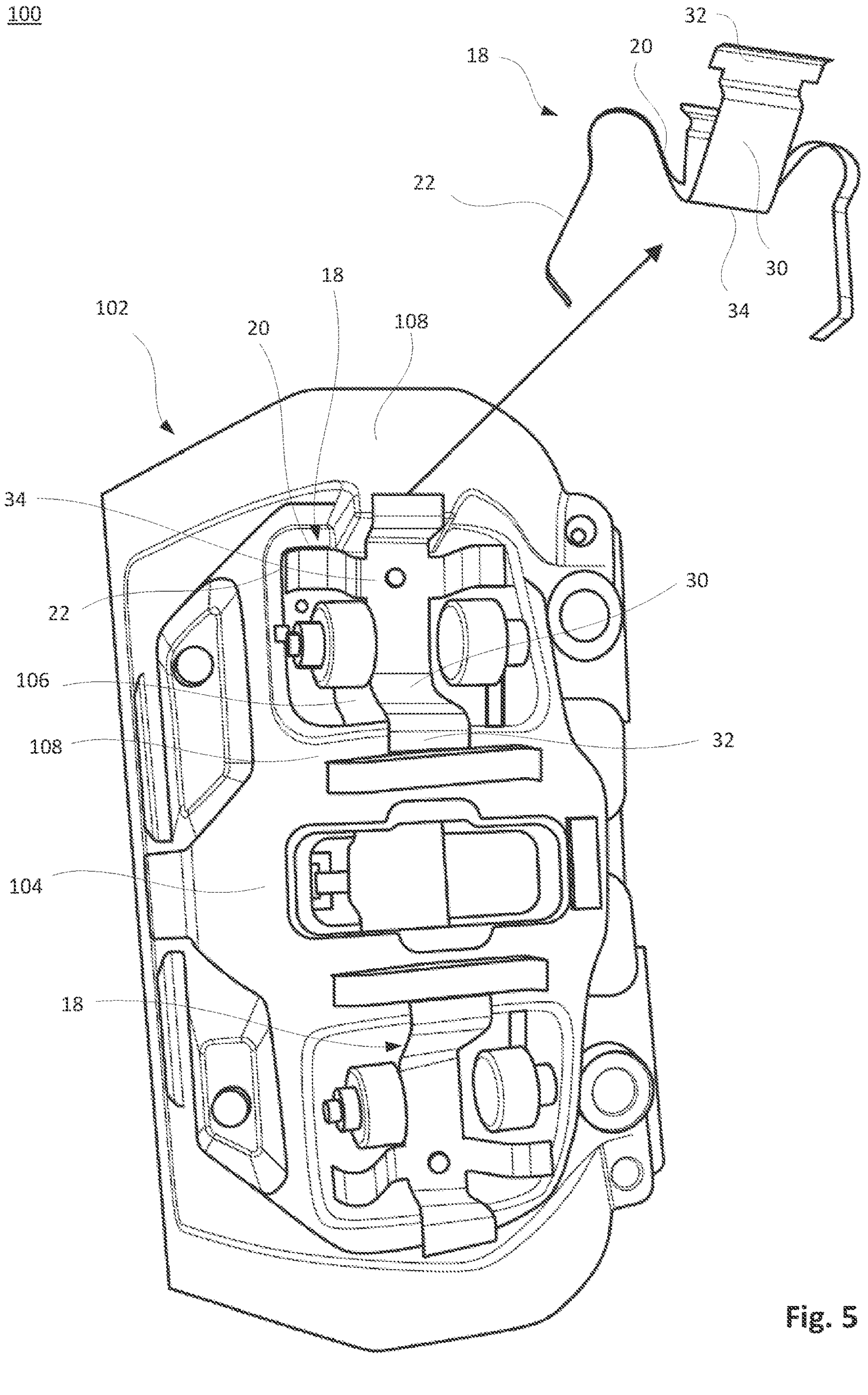
FIG. 5 shows a fixed caliber brake which includes a brake lining arrangement according to the invention.

FIG. 5 shows a view of a disc brake, designated as a whole with the reference numeral 100, for a vehicle. The disc brake 100 includes a frame-like housing 102 having a brake caliper 104, which is designed in the present case as a fixed caliper. The housing 102 is used as a support body for a brake lining arrangement 10 (not shown in the present case), which is arranged in a shaft 106 or a recess of the housing 102. The brake lining arrangement 10 includes two brake linings 12 spaced apart from one another. The reaction forces generated during a braking procedure are transmitted via the lining carrier plates 14 of the respective brake linings 12, which typically consist of metal, to the housing 102.

In the present case, two spring elements 18 according to the invention are arranged on the brake linings 12 in the shaft 106 of the housing 102. The spring elements 18 are each designed in the present case as a cross-shaped brake lining retainer spring, which is held, for example, by means of holding elements (not shown here), such as a holding pin or holding bracket, a bent wire, or a clamping element in the shaft 106 on the housing 102 in order to enable a secure seat. The brake linings 12 are pre-tensioned inward in the radial direction of the brake disc (not shown in the present case) via the brake lining retainer springs 18.

The spring element 18 includes spring legs 30 extending parallel to the brake disc (not shown in the present case), which are formed having contact projections 32 at their respective ends, which are supported on housing crossbeams 108 of the brake caliper 104. The spring legs 30 are connected, in particular riveted, to a connection section 34 of a spring bridge 20 of the spring element 18. The spring bridge 20 spans the brake linings 12 and the brake disc axially and connect two spring arms 22 to one another. The spring arms 22 extend nearly orthogonally at an angle to the spring bridge 20 into the shaft 106 and each engage on a rear side of a lining carrier plate 14 of the brake lining 12.

The bimetal element 24 is formed on the spring bridge 20 and/or the spring arms 22. As described above in FIGS. 1 to 4, the shape of the bimetal element 24 and thus the shape of the spring element 18 changes as a function of a temperature T, wherein the axial distance in the starting position or the air gap between the brake lining 12 and the brake disc is variable via the shape change of the spring element 18. In other words, the starting position of the brake lining 12 is influenced as a function of the temperature of the spring element 18. The spring element 18 is used to ensure a small air gap having an accompanying residual braking torque for heating the brake disc at cold temperatures T. At warm temperatures T, the spring element 18 enlarges the air gap in order to reduce or entirely avoid a residual braking torque.

Figure 6:
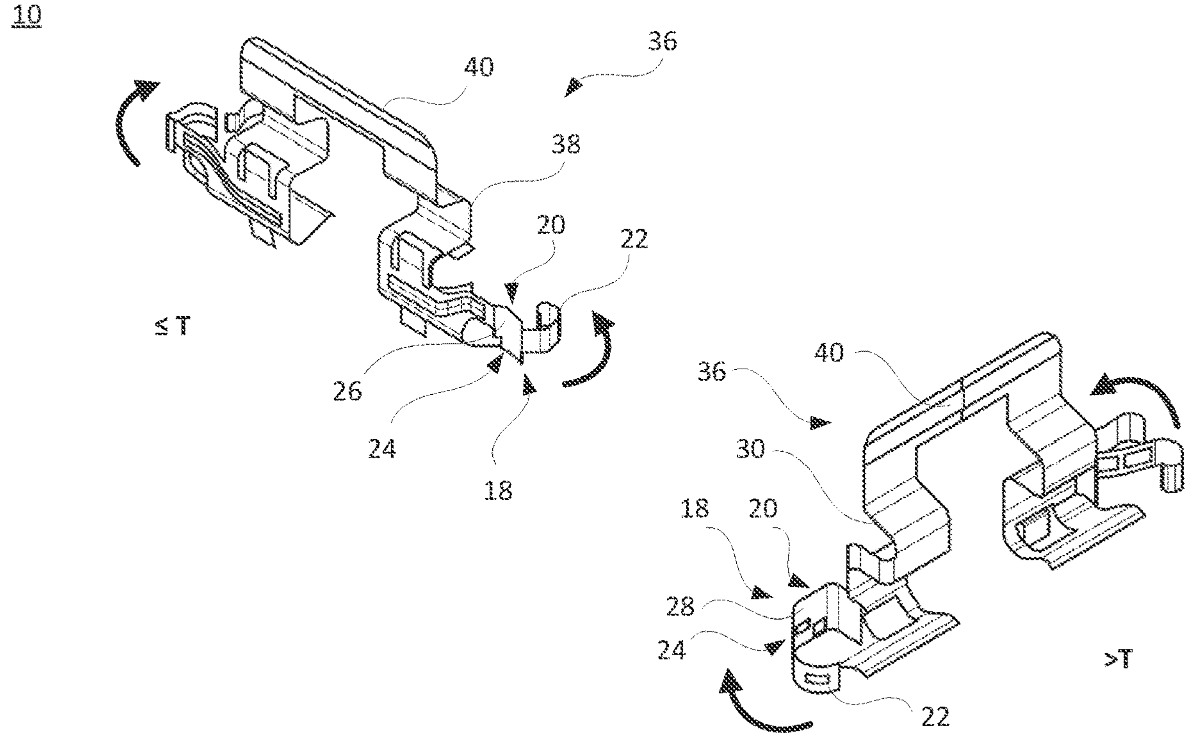
FIG. 6 shows a spring element of a brake lining arrangement according to the invention.

FIG. 6 shows an alternative embodiment of a spring element 18. In the present case, the spring element 18 is formed in one piece with a detent clamp 36, via which the spring element 18 is arrangeable on a brake lining 12, in order to act with a restoring force on the brake lining 12. Alternatively, the detent clamp 36 and the spring element 18 can be formed in two pieces and can be connected to one another via a connecting element.

The detent clamp 36 is formed in the present case having two legs 38, which are connected to one another via a central section 40, which spans a brake disc (not shown in the present case). The legs 38 each press against a lateral circumferential surface 42 of a lining carrier plate 14 (not shown in the present case) and extend along the lateral circumferential surface 42. In the present case, the legs 38 each have a contour which engages, for example, in recesses of the circumferential surface 42 of the lining carrier plate 14. The detent clamp 36 at least partially grasps around the lining carrier plate 14 in the circumferential direction. The detent clamp 36 supports the brake lining 12 in the installed state of the brake lining arrangement 10 in a disc brake 100 against circumferential forces and holds it in position in the radial direction with respect to the brake disc by pre-tension.

The spring element 18 includes a spring arm 22, which engages on the lining carrier plate 14. The spring arm 22 can be riveted with the lining carrier plate 14, for example. The spring arm 22 engaging on the lining carrier plate 14 is connected via a spring bridge 20 to the detent clamp 36. The spring element 18 spans and clamps around the lateral circumferential surface 42 of the lining carrier plate axially in the present case and the spring arm 22 extends in the direction of the detent clamp 36.

In the present case, the spring bridge 20 includes the bimetal element 24. The material having the higher coefficient of expansion or the second layer 28 is arranged in the direction of the brake lining 28 and the material having the lower coefficient of expansion or the first layer 26 is arranged facing away from the brake lining 12. At a high temperature T, as shown in the right illustration of FIG. 6, the second layer 28 expands more strongly in contrast to the first layer 26. The spring bridge 20 thus bends in the direction of the first layer 26 or away from the rear side of the lining carrier plate 14. The axial distance between the brake lining 12 and the brake disc thus increases, i.e., the starting position of the brake lining 12 moves away from the brake disc. As a result, the air gap increases, due to which residual coefficients of friction between the brake lining 12 and the brake disc are eliminated or largely avoided.

At a low temperature T, as shown in the left illustration of FIG. 6, the second layer 28 contracts more than the first layer 26. The spring element 18 thus curves in a direction toward the second layer 28 and displaces the brake lining 12 in the direction of the brake disc. This has the result that the axial distance of the brake lining 12 from the brake disc in the starting position of the brake lining 12 is reduced. Possible restoration of the brake lining 12 in the axial direction after a deflection of the brake lining 12 is thus reduced, and the air gap is reduced such that a residual braking torque results between the brake lining 12 and the brake disc, due to which the brake disc heats up slightly.

Figure 7:
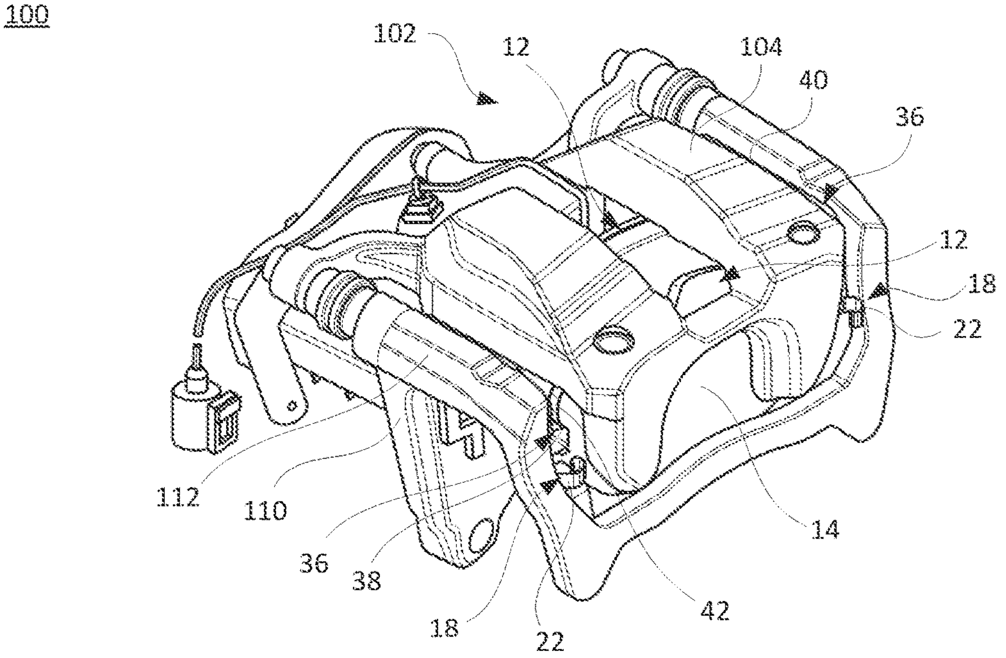
FIG. 7 shows a floating caliper brake which includes a brake lining arrangement according to the invention.

FIG. 7 shows a disc brake 100, comprising a frame-like housing 102, the main body of which is designed in the present case as a floating caliper or fist caliper, and a brake support body or a brake carrier 110, which guides or mounts the brake linings 12 of a brake lining arrangement 10 with play. The brake lining arrangement 10 includes two brake linings 12 in the present case, which are each arranged in their starting position via an axial distance on a brake disc (not shown in the present case). A tensioning device is received in the housing 102, via which the brake linings 12 are movable toward the brake disc during a braking procedure.

A spring element 18 according to the invention, as described above in FIG. 6, is arranged on the brake linings 12. The spring element 18 is arranged via a detent clamp 36 on the brake lining 12. The detent clamp 36 is at least partially arranged between the brake carrier 110 and the brake linings 12, in particular a lateral circumferential surface 42 of the lining carrier plate 14 of the brake lining 12. The detent clamp 36 is arranged on a transverse element 112 of the brake carrier 110 and includes legs 38 which can engage around, for example, projections formed on the transverse element 112. The detent clamp 36 can be formed on the brake carrier 110 or can be permanently connected thereto.

The detent clamp 36 extends around the lateral circumferential surface 42 of a lining carrier plate 14 of a brake lining 12 in the circumferential direction. The legs 38 of the detent clamp 36 each extend here along the lateral circumferential surface 42 of the lining carrier plate 14. The detent clamp 36 supports the brake lining 12 in the installed state of the brake lining arrangement 10 in the disc brake arrangement 100 against circumferential forces and holds it in position in relation to the brake disc by pre-tension in the radial direction.

The spring element 18 according to the invention exerts a restoring force on the brake lining 12 after a deflection of the brake lining 12. The spring element 18 is connected via a spring arm 22 to a rear side of the lining carrier plate 14, wherein the spring arm 22 is arranged on the detent clamp 36 via a spring bridge 20 (not shown here), which is at least partially formed using a bimetal element 24, on which the detent clamp 36 is arranged. The spring element 18 curves at low temperature T in the direction of the lining carrier plate 14, due to which the starting position of the brake lining 12 moves in the direction of the brake disc and the air gap is sufficiently small that a residual coefficient of friction is present between the brake linings 12 and the brake disc. At higher temperatures T, the bimetal element 24 of the spring element 18 bends in the opposite direction. The spring element 18 thus pulls the brake linings 12 farther apart in a starting position and an air gap without residual coefficients of friction results.

The invention claimed is:

1. A brake lining arrangement for a disc brake of a vehicle, comprising: at least one brake lining, which in a starting position is arranged axially spaced apart from a brake disc in the installed state of the disc brake, and wherein the brake lining includes a lining carrier plate, on which a friction lining is attached, wherein a spring element positioning the brake lining is arranged on at least one brake lining, which spring element is at least partially formed from a bimetal element and changes the axial distance of the brake lining relative to the brake disc in the starting position as a function of a temperature, wherein the bimetal element comprises a strip including two layers permanently connected to one another, each of the two layers having materials with different coefficients of thermal expansion.

2. The brake lining arrangement according to claim 1, wherein the spring element, in the installed state of the brake lining arrangement in a disc brake, reduces the axial distance at a predetermined temperature and/or upon falling below the predetermined temperature by way of the bimetal element in order to generate a coefficient of friction between the brake lining and the brake disc.

3. The brake lining arrangement according to claim 2, wherein the spring element includes at least one spring arm, which engages on a rear side of the lining carrier plate facing away from the friction lining, wherein the spring arm is connected to a spring bridge arranged at an angle in relation to the spring arm and to the lining carrier plate.

4. The brake lining arrangement according to claim 3, wherein the spring bridge connects the spring arm to a detent clamp, which surrounds the lateral circumferential surface of at least one lining carrier plate at least partially in the circumferential direction.

5. The brake lining arrangement according to claim 4, wherein the spring element is formed in one piece with the detent clamp.

6. The brake lining arrangement according to claim 3, wherein the spring bridge axially spans the brake linings arranged mutually opposite on the brake disc, wherein the spring bridge connects to one another the spring arms engaging on the respective lining carrier plate.

7. The brake lining arrangement according to claim 6, wherein the spring arms include the bimetal element.

8. The brake lining arrangement according to claim 4, wherein the spring bridge includes the bimetal element.

9. The brake lining arrangement according to claim 6, wherein the spring bridge includes a connection section, via which at least two spring legs extending in the longitudinal direction of the brake lining are connected.

10. A disc brake for a vehicle, comprising: a housing, which spans a brake lining arrangement arranged on a brake disc, wherein the brake lining arrangement includes at least one brake lining, which is guided in a brake support body and can be caused to interact with the brake disc to achieve a braking action, wherein the brake lining arrangement is designed according to claim 1.

11. The brake lining arrangement according to claim 6, wherein the spring bridge includes the bimetal element.

12. The brake lining arrangement according to claim 7, wherein the spring bridge includes the bimetal element.

13. The brake lining arrangement according to claim 7, wherein the spring bridge includes a connection section, via which at least two spring legs extending in the longitudinal direction of the brake lining are connected.

14. The brake lining arrangement according to claim 8, wherein the spring bridge includes a connection section, via which at least two spring legs extending in the longitudinal direction of the brake lining are connected.

* * * * *